United States Patent [19]

Seki et al.

[11] Patent Number: 4,982,180

[45] Date of Patent: Jan. 1, 1991

[54] METHOD OF DISPLAYING STRUCTURES THREE-DIMENSIONALLY

[75] Inventors: Masaki Seki; Takashi Takegahara, both of Tokyo, Japan

[73] Assignee: Fanuc Ltd., Minamitsuru, Japan

[21] Appl. No.: 319,943

[22] PCT Filed: Jul. 20, 1988

[86] PCT No.: PCT/JP88/00720

§ 371 Date: Mar. 7, 1989

§ 102(e) Date: Mar. 7, 1989

[87] PCT Pub. No.: WO89/00737

PCT Pub. Date: Jan. 26, 1989

[30] Foreign Application Priority Data

Jul. 20, 1987 [JP] Japan .................................. 62-180835

[51] Int. Cl.⁵ .............................................. G09G 1/00
[52] U.S. Cl. .................... 340/703; 340/729; 340/747; 364/518
[58] Field of Search ............. 340/729, 703, 701, 702, 340/747; 364/518

[56] References Cited

U.S. PATENT DOCUMENTS 3,577,031  5/1969  McCormick ........................ 340/701
4,509,043  4/1985  Mossaides ........................... 340/703
4,721,952  1/1983  Huber ................................... 340/729
4,821,210  4/1989  Rumbaugh .......................... 340/729

FOREIGN PATENT DOCUMENTS

0002735  1/1984  Japan .

*Primary Examiner*—Alvin E. Oberley
*Attorney, Agent, or Firm*—Staas & Halsey

[57] ABSTRACT

A method of displaying a structure (SML) three-dimensionally, in which a rectangular parallelepiped (RP), having on each of its sides distances ($L_x$, $L_y$, $L_z$) between minimum and maximum positions along each axis of a structure (SML) is constituted by a set of a number of unit solids, e.g., unit cubes (UC), of the same shape and same dimensions. The structure is represented by information indicating whether each unit solid is part of the structure (SML). Individual ones of the unit solids constituting the structure (SML) are displayed in order starting from unit solids seen on a the front side of the structure. The face of a unit solid overlapping a face of a unit solid already displayed is not displayed; instead, only the visually foremost faces thereof are displayed, thereby displaying a perspective view of the three-dimensional structure (SML).

3 Claims, 6 Drawing Sheets

| GRAPHIC ALREADY DISPLAYED | CUBE GRAPHIC DISPLAYED NEXT | RESULTS OF LOGICAL OPERATIONS |
|---|---|---|
| .......BBBB<br>......BBBBG<br>.....BBBBGG<br>....RRRRGGG<br>....RRRRGG<br>....RRRRG<br>LOGICAL OPERATION RANGE | ...BBBB....<br>..BBBBG....<br>.BBBBGG....<br>RRRRGGG....<br>RRRRGG.....<br>RRRRG......<br>LOGICAL OPERATION RANGE | ...BBBBBBBB<br>..BBBBBBBBG<br>.BBBBBBBBGG<br>RRRRRRRRGGG<br>RRRRRRRRGG<br>RRRRRRRRG<br>LOGICAL OPERATION RANGE |

RED FRAME BUFFER

| Rc | Rn | Rx |
|---|---|---|
| 00000000000 | 00000000000 | 00000000000 |
| 00000000000 | 00000000000 | 00000000000 |
| 00000000000 | 00000000000 | 00000000000 |
| 00001111000 | 11110000000 | 11111111000 |
| 00001111000 | 11110000000 | 11111111000 |
| 00001111000 | 11110000000 | 11111111000 |

GREEN FRAME BUFFER

| Gc | Gn | Gx |
|---|---|---|
| 00000000000 | 00000000000 | 00000000000 |
| 00000000001 | 00000010000 | 00000000001 |
| 00000000011 | 00000110000 | 00000000011 |
| 00000000111 | 00001110000 | 00000000111 |
| 00000000110 | 00011100000 | 00000000110 |
| 00000000100 | 00110000000 | 00000000100 |

BLUE FRAME BUFFER

| Bc | Bn | Bx |
|---|---|---|
| 00000001111 | 00011110000 | 00011111111 |
| 00000011110 | 00111100000 | 00111111110 |
| 00000111100 | 01111000000 | 01111111100 |
| 00000000000 | 00000000000 | 00000000000 |
| 00000000000 | 00000000000 | 00000000000 |
| 00000000000 | 00000000000 | 00000000000 |

METHOD OF DISPLAYING STRUCTURES THREE-DIMENSIONALLY

BACKGROUND OF THE INVENTION

1. Field of the Invention

This invention relates to a three-dimensional display method for structures and, more particularly, to a display method through which structures can be displayed in three dimensions in a simple manner without complicated computations.

2. Description of the Related

With the strides that have been made in computer graphics, a variety of methods of displaying various structures three-dimensionally have been proposed and put into practice in recent years. In these conventional three-dimensional display methods, a structure generally is expressed by an internal model capable of being recognized mathematically.

For this reason, a three-dimensional display of a structure in the prior art requires a large number of calculations, thereby necessitating a costly apparatus capable of processing at high speeds. However, a conversational-type numerical control (NC) apparatus or NC automatic programming apparatus cannot be provided with a high-speed processing function for reasons of cost. At best, these apparatus can be equipped with microprocessors of the type presently in general use. In consequence, an enormous amount of processing time is needed to display a structure three-dimensionally, thus making it impossible to achieve the display rapidly. Thus, the conventional methods are impractical.

In a conversational-type NC apparatus or NC automatic programming apparatus, whether or not machining will be performed correctly based on originated NC data need only be verified by the three-dimensional display of the workpiece, thus making it unnecessary to graphically portray the workpiece with high precision.

SUMMARY OF THE INVENTION

The present invention has been devised in view of the foregoing points and its object is to provide a display method through which a structure can be displayed three-dimensionally at high speed by a comparatively inexpensive apparatus.

In a method of displaying a structure three-dimensionally according to the present invention, a rectangular parallelepiped having, as each of its sides, distances $L_x$, $L_y$, $L_z$ between minimum and maximum positions along each axis of a structure is constituted by a set of a number of unit solids, e.g., unit cubes, of the same shape and same dimensions, and the structure is expressed by information indicating whether each unit solid is part of the structure. Individual ones of the unit solids constituting the structure are displayed in order starting from unit solids seen on a foremost side of the structure, and the face of a unit solid overlapping a face of a unit solid already displayed is not displayed; instead, only the visually foremost faces thereof are displayed, thereby displaying a perspective view of the three-dimensional structure. It can be arranged so that the faces of the unit solids are displayed in colors different from one another so as to render them distinguishable, and so that those faces of the unit solids lying in the same plane are displayed in the same color, thus making it possible for the faces of the overall structure to be visually distinguished from one another.

BRIEF DESCRIPTION OF THE DRAWINGS

FIGS. 6(a)–5(c) are three-dimensional vies for describing a method of generating a paint graphic;

DESCRIPTION OF THE PREFERRED EMBODIMENT

Figure 1:
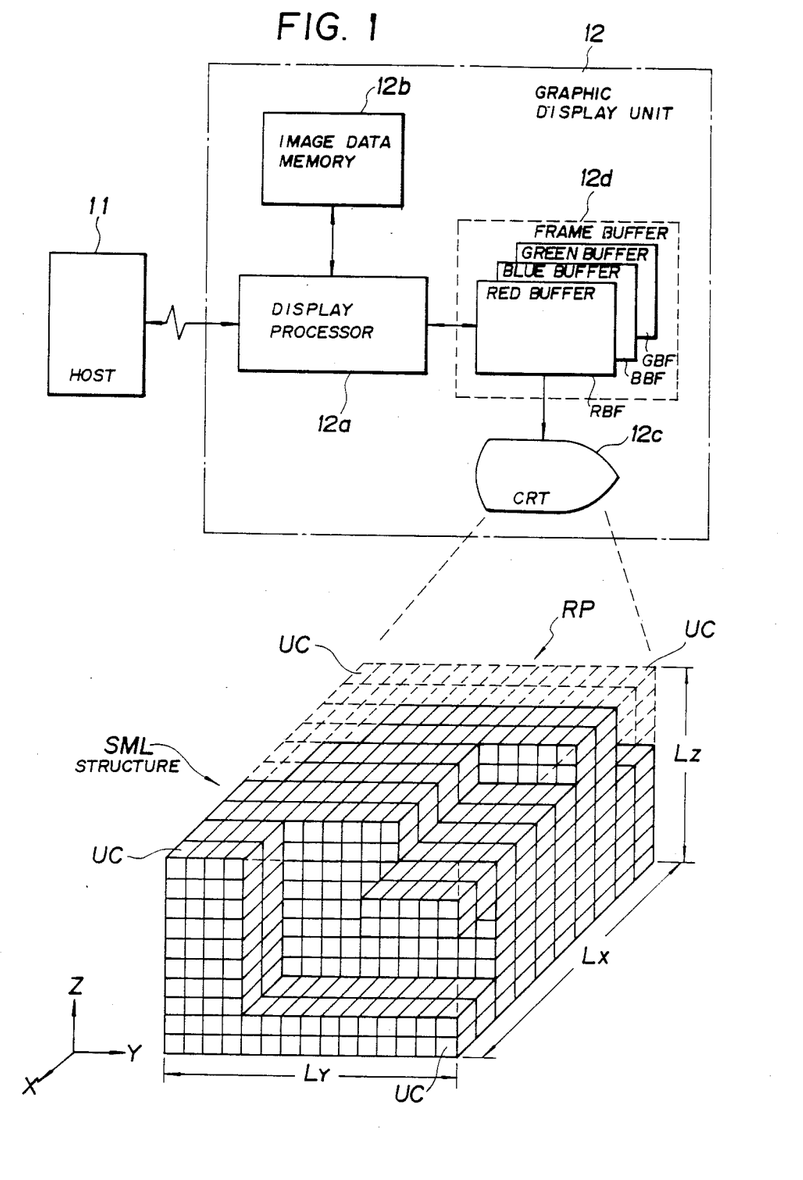
FIG. 1 is a block diagram of a system for practicing the method of the present invention.

FIG. 1 is a block diagram of a system for practicing the method of the present invention. Numeral 11 denotes a host, and numeral 12 denotes a graphic display unit having a display processor 12a, an image data memory (e.g., a RAM) 12b for storing image data, a color cathode-ray tube (CRT) 12c, and a frame buffer 12d having a storage area for the picture elements of the CRT. Frame buffers 12d are prepared for the colors red, blue and green, respectively, though these are not shown. RBF denotes a buffer for red, BBF a buffer for blue, and GBF a buffer for green.

Figure 2:
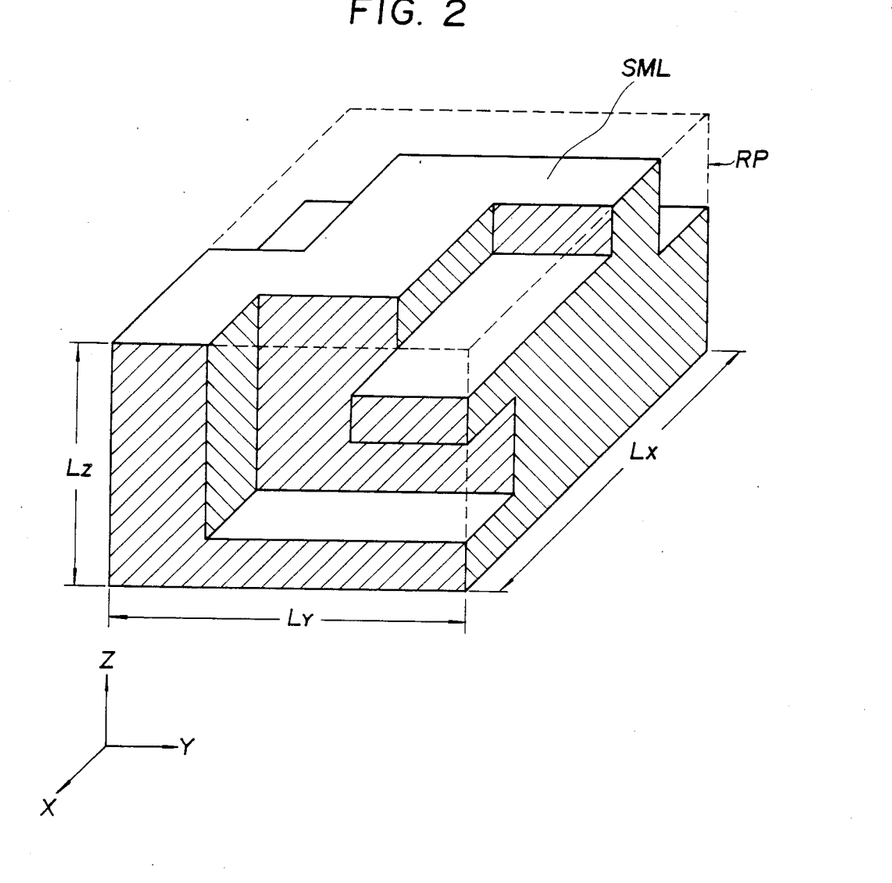
FIG. 2 is a perspective view of a structure.
Figure 3:
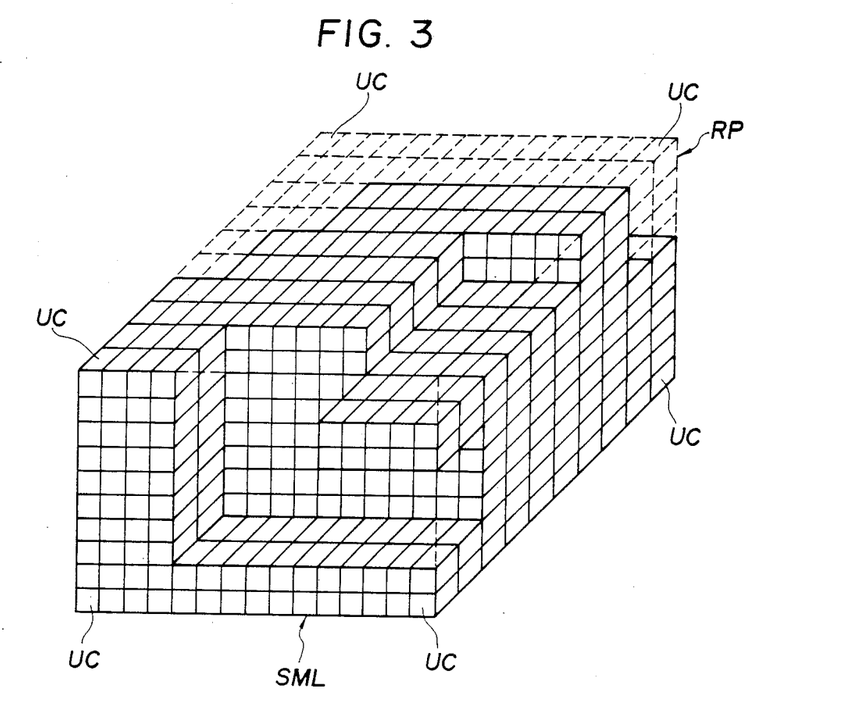
FIG. 3 is a perspective view of the structure divided into unit cubes.
Figure 4:
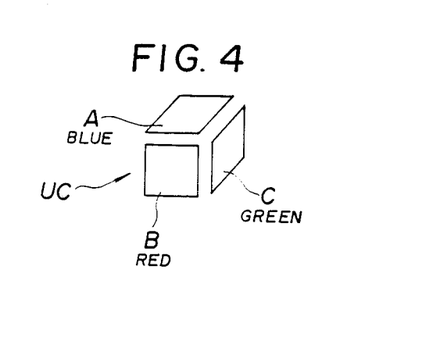
FIG. 4 is a view for describing the display color of each of the faces of a unit cube.

The host 11 obtains a rectangular parallelepiped RP having, as respective ones of its sides, distances ($L_x$, $L_y$, $L_z$) between minimum and maximum positions along each axis of a structure SML, as shown in FIG. 2, then divides the rectangular parallelepiped RP into a number of unit solids (e.g., unit cubes) UC of the same shape and same dimensions, as shown in FIG. 3; originates data indicating whether each unit solid UC constitutes the structure SML. Image data necessary for displaying the structure SML on the CRT is supplied in accordance with the abovementioned data. Included are position data relating to the rectangular parallelepiped RP and color data relating to the faces of the solids; method of projection (orthogonal axonometric projection, conformal projection, etc.) is determined by the host 11 which transmits the data. The method of projection in the illustrated example is one (conformal) in which the right-hand perspective illustration of the structure SML is displayed, as shown in FIG. 3. The upper face A (see FIG. 4) of each unit cube UC is displayed in the color blue, the front face B in the color red, and the right-hand face in the color green. The corner lines of the structure SML are displayed in a color different from the colors of the cube faces, and the background is displayed in a color different from those of the corner lines and faces.

Figure 5A:
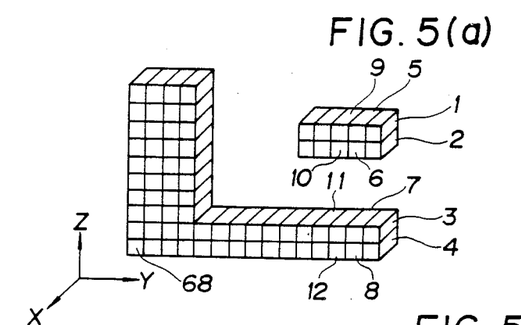
FIGS. 5(a)–5(d) are three-dimensional views for describing the order in which the unit cubes are displayed in the present invention.

When the host 11 transmits the image data, the display processor 12a in the graphic display unit 12 stores the image data in the memory 12b. Thereafter, the display processor 12a generates the images of individual ones of those unit cubes UC constituting the structure SML in order starting from those cubes seen nearer the front of the structure, stores these images in the frame buffer 12d and displays them on the CRT 12c. More specifically, display starts from the unit cubes having the largest X-axis coordinate. With regard to rows and columns of the unit cubes having the same X-axis coordinate, the unit cubes are displayed in order starting from those having the largest Y-axis coordinate. With regard to columns of unit cubes having the same Y-axis coordinate, the unit cubes are displayed in order starting from that having the largest Z-axis coordinate. As a result, the images of the unit cubes are generated in the frame buffer 12d and displayed on the CRT in the order of the numbers shown in FIG. 5(a).

Figure 5B:
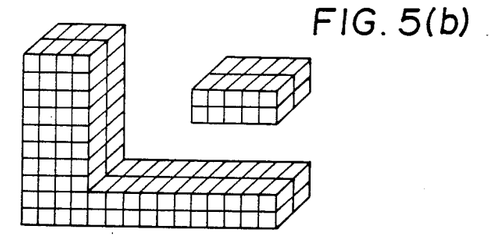
Figure 5C:
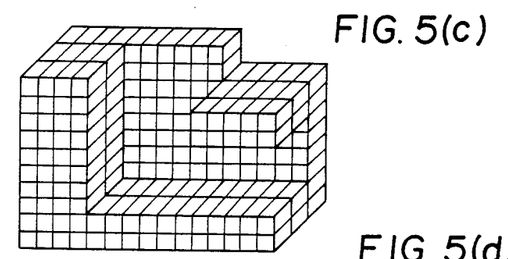
Figure 5D:
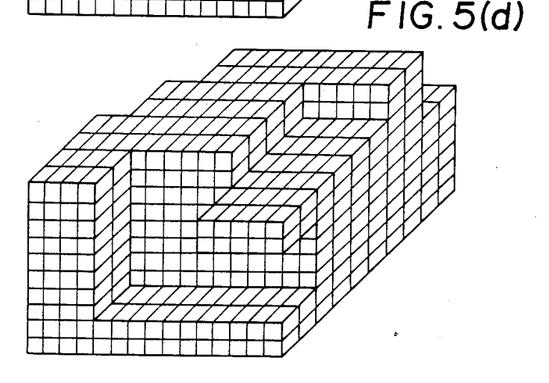

Thereafter, the above-described processing is performed with regard to the unit cubes having the next largest X-axis coordinate, so that the image shown in FIG. 5(b) is stored in the frame buffer 12d and displayed on the CRT 12c. Similar processing is then performed to display the image shown in FIG. 5(c) on the CRT. Finally, the perspective illustration of the structure shown in FIG. 5(d) is stored in the frame memory 12d and displayed on the CRT 12c.

Figure 6A:
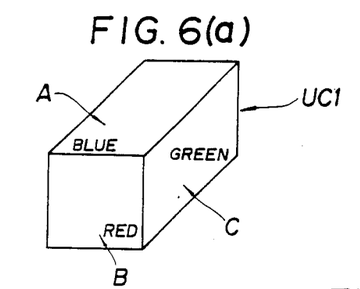
Figure 6B:
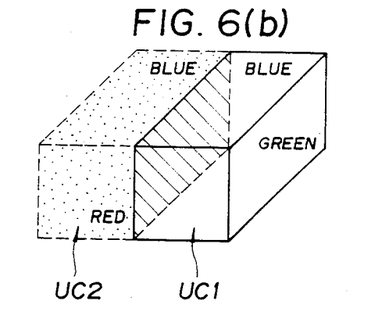
Figure 6C:
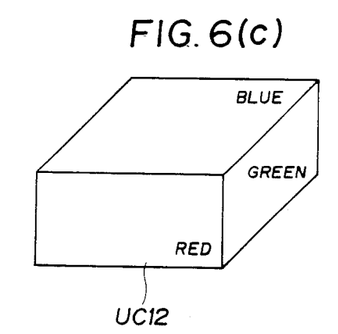

When the images of individual unit cubes constituting the structure SML are stored in the frame buffer 12d and displayed in order starting from those unit cubes nearer the front of the structure, as described above, the face of a subsequent unit cube overlapping a face of a unit cube already displayed is not displayed; only the visually forward faces are displayed. For example, if the image of a unit cube UC1 shown in FIG. 6(a) is stored in the frame buffer 12d (with the paint image of top face A being stored in the blue buffer BBF, the paint image of the front face B in the red buffer RBF and the paint image of the right-hand face C in the green buffer GBF) and then the image of another unit cube UC2 shown by the dashed lines in FIG. 6(b) is generated, the paint images of the unit cube UC1 already displayed are displayed preferentially. Accordingly, with regard to the faces where the unit cube UC1 and next unit cube UC2 overlap [see the shaded portion in FIG. 6(b)], the paint images of the unit cube UC1 already displayed remain intact, and the paint images of the next unit cube UC2 are generated only on the faces thereof not overlapped [see the dotted portions in FIG. 6(b)]. As a result, combined paint images are stored in the frame buffer 12d and displayed on the CRT 12c as shown in FIG. 6(c).

In order to thus preferentially display paint images already displayed (i.e., paint images that have been stored in the frame buffer 12d) and display paint images of the next unit cube only with regard to faces thereof not overlapped, the display processor 12a performs the logical operations set forth hereinbelow.

Specifically, the following logical operations are performed for every blue, red and green paint image with respect to each picture element in the frame buffer 12d within a range in which the next unit cube is displayed:

$$R_x = R_C + (*G_C \cdot *B_C) \cdot R_N$$
$$G_x = G_C + (*B_C \cdot *R_C) \cdot G_N$$
$$B_x = B_C + (*R_C \cdot *G_C) \cdot B_N$$

The operational results $R_x$, $G_x$, $B_x$ are stored in the storage areas of the red buffer RBF, green buffer GBF and blue buffer BBF, respectively corresponding to the picture elements. It should be noted that the symbol "*" signifies negation. Further, $R_C$ represents pixel data in the red buffer and indicative of a graphic already displayed, e.g., UC1;

$G_C$ represents pixel data in the green buffer and indicative of a graphic already displayed, e.g., UC1;

$B_C$ represents pixel data in the blue buffer and indicative of a graphic already displayed, e.g., UC1;

$R_N$ represents pixel data relating to red in the next displayed unit cube, e.g., UC2;

$G_N$ represents pixel data relating to green in the next displayed unit cube, e.g., UC2;

$B_N$ represents pixel data relating to blue in the next displayed unit cube, e.g., UC2;

$R_x$ represents the result of the logical operation stored as image data in the red buffer to produce the graphic displayed next;

$G_x$ represents the result of the logical operation stored as image data in the green buffer to produce the graphic displayed next; and $B_x$ represents the result of the logical operation stored as image data in the blue buffer to produce the graphic displayed next.

Figure 7:
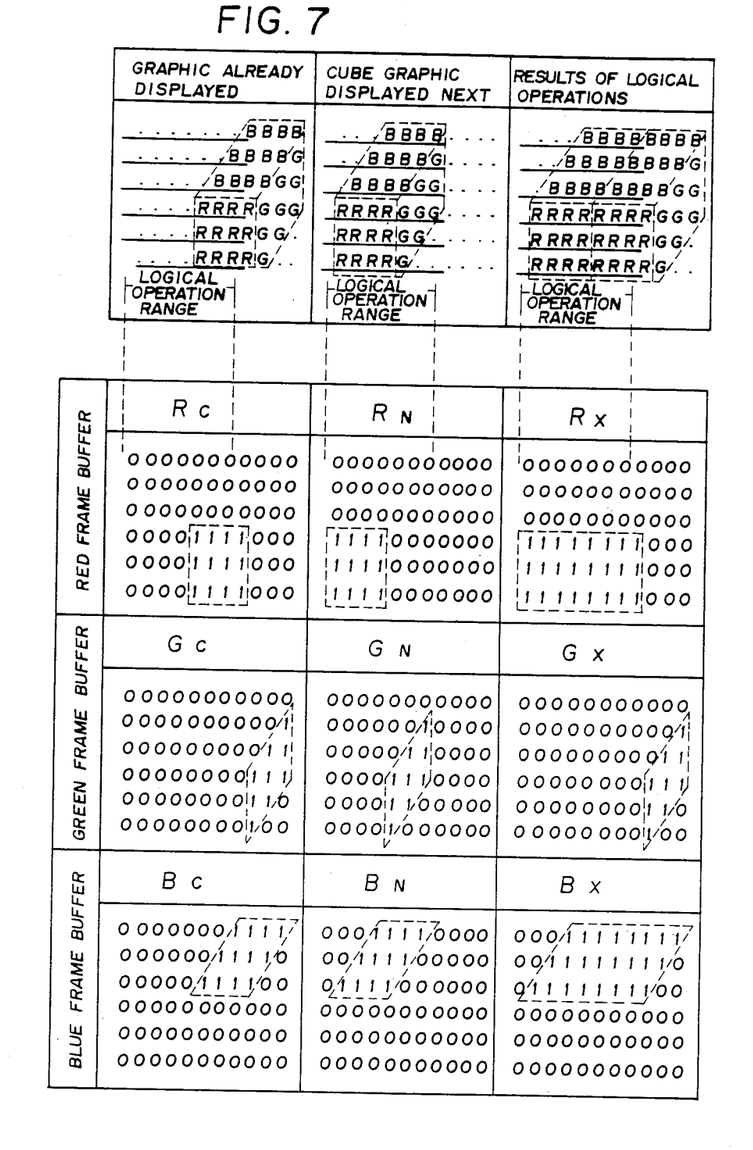
FIG. 7 is a two-dimensional view for describing logical operations for the purpose of generating paint graphics.

FIG. 7 is a chart for describing the foregoing logical operations. The upper most section provides three-dimensional the graphic already displayed on the left (B represents blue, R red and G green), the unit cube graphic to be displayed next in the middle, and the display graphic based on the results of the logical operations on the right. The remaining sections indicate the contents of the frame buffers. The left column corresponds to the image data $R_C$, $G_C$, $B_C$ of the already displayed graphic, the middle column corresponds to the image data $R_N$, $G_N$, $B_N$ of the unit cube, e.g., UC2 to be displayed next, and the right column corresponds to the image data $R_x$, $G_x$, $B_x$, namely the results of the logical operations. The row from top to bottom correspond to the red frame buffer RBF, green frame buffer and blue frame buffer, respectively.

Figure 8:
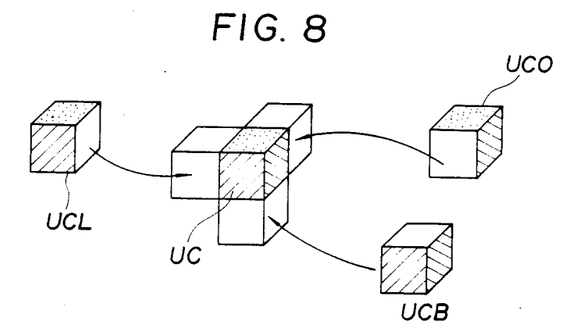
FIG. 8 is another three-dimensional view of paint graphic generation.

In accordance with the foregoing, with regard to the unit cube UC bounded by the bold solid line as shown in FIG. 8, a unit cube UCL which contacts the left side of unit cube UC has the paint images of its top and front faces displayed, a unit cube UCB which contacts the bottom face of unit cube UC has the paint images of its front and right-hand faces displayed, and a unit cube UCO which contacts the opposite (rear) face of unit cube UC has the paint images of its top and right-hand faces displayed.

Though a case has been described above in which the structure is expressed as a set of unit cubes, expression is possible as rectangular parallelepipeds, triangular prisms and the like as unit solids. Further, though a case is described in which the faces of the unit cubes are displayed in the three primary colors of red, blue and green, the faces can be displayed in colors other than these three primary colors, and different patterns can be applied to the various faces so that each face can be displayed in a manner distinguishable from the others.

In accordance with the present invention as described above, a rectangular parallelepiped having, on each of its sides, distances between minimum and maximum positions along each axis of a structure is constituted by a set of a number of unit solids A structure is expressed by information indicating whether each unit solid is part of the structure. Individual ones of the unit solids constituting the structure are displayed in order starting from unit solids seen on a the front side of the structure. The face of a unit solid overlapping a face of a unit solid already displayed is not displayed; instead, only the visually foremost faces thereof are displayed. This makes it possible to three-dimensionally display a structure at high speed by means of a comparatively inexpensive apparatus.

What is claimed is:

1. A method of displaying a structure three-dimensionally, comprising the steps of:
   (a) forming, using a set of unit solids having faces with identical shapes and dimensions, a rectangular parallelepiped having, as respective ones of its sides, distances between minimum and maximum positions along each axis of a structure, and expressing the structure by information indicating whether each unit solid constitutes said structure;
   (b) displaying individual ones of the unit solids constituting said structure in order, starting from the unit solids seen on a foremost side of the structure, in dependence upon a predetermined projection method displaying first, second and third faces of each unit solid using first, second and third colors, respectively, by:
      (b1) storing a first color image, a second color image and a third color image in a first frame buffer, a second frame buffer and a third frame buffer, respectively, and
      (b2) combining the first, second and third color images stored in the first, second and third frame buffers to display a three-dimensional image of the structure; and
   (c) refraining from displaying a face of each unit solid overlapping the face of an already displayed unit solid, and displaying only visually foremost faces thereof, thereby displaying the structure three-dimensionally.

2. A method of displaying a structure three-dimensionally according to claim 1, wherein the first, second and third colors are respectively red, green and blue.

3. A method of displaying a structure three-dimensionally according to claim 2, further comprising the step of (d) repeating logical operations with regard to image data for each unit solid, to generate final red, green and blue images, the logical operations including:

$$R_x = R_C + (*G_C \cdot *B_C) \cdot R_N$$
$$G_x = G_C + (*G_C \cdot *R_C) \cdot G_N$$
$$B_x = B_C + (*R_C \cdot *G_C) \cdot B_N$$

where * signifies negation, $R_C$ represents pixel data in the red frame buffer and indicative of a graphic already displayed; $G_C$ represents the pixel data in the green frame buffer and indicative of the graphic already displayed; $B_C$ represents the pixel data in the blue frame buffer and indicative of the graphic already displayed; $R_N$ represents the pixel data relating to red in a next graphic to be displayed; $G_N$ represents the pixel data relating to green in the next graphic; $B_N$ represents the pixel data relating to blue in the next graphic; $R_x$ represents the image data in the red frame buffer of a resulting graphic displayed next; $G_x$ represents the image data in the green frame buffer of the resulting graphic; and $B_x$ represents the image data in the blue frame buffer of the resulting graphic.

* * * * *

UNITED STATES PATENT AND TRADEMARK OFFICE
CERTIFICATE OF CORRECTION

PATENT NO. : 4,982,180

DATED : January 1, 1991

INVENTOR(S) : Seki et al.

It is certified that error appears in the above-identified patent and that said Letters Patent is hereby corrected as shown below:

On the title page:
ABSTRACT [57], line 11, delete "a".

Col. 1,      line 13, after "Related" insert --Art--;

Col. 2,      line 10, change "5(a(-" to --5(a)- --;
              line 13, "5" should be --6--; change "vies" to --views--;
              line 31, after "these" insert --colors--;
              line 40, "3;" should be --3. The host 11 may--;
              line 41, "constitutes" should be --is part of--;
              line 46, "solids;" should be --solids. The--.

Col. 3,      line 60, after "respectively" insert --,-- .

Col. 4,      line 18, after "mensional" insert --views with--;
              line 20, "middle ," should be --middle,--;
              line 24, "$B_c$of" should be --$B_c$ of--;
              line 30, "row" should be --rows--;
              line 57, "solids A" should be --solids. A--;
              line 61, delete "a".

UNITED STATES PATENT AND TRADEMARK OFFICE
CERTIFICATE OF CORRECTION

PATENT NO. : 4,982,180

DATED : January 1, 1991

INVENTOR(S) : Seki et al.

It is certified that error appears in the above-identified patent and that said Letters Patent is hereby corrected as shown below:

Col. 6, line 11, "$R_x = R_c+(*G_c \cdot *B_c) \cdot R_N$" should be
-- $R_x = R_c+(*G_c \cdot *B_c) \cdot R_N$ --;

line 12, "$G_x = G_c+(*G_c \cdot *R_c) \cdot G_N$" should be
-- $G_x = G_c+(*B_c \cdot *R_c) \cdot G_N$ --;

line 13, "$B_x = B_c+(*R_c \cdot *G_c) \cdot B_N$" should be
-- $B_x = B_c+(*R_c \cdot *G_c) \cdot B_N$ --.

Signed and Sealed this

Thirtieth Day of June, 1992

Attest:

DOUGLAS B. COMER

*Attesting Officer*    *Acting Commissioner of Patents and Trademarks*